April 30, 1935.  A. J. MERRITT  1,999,913
FILTER
Filed Sept. 19, 1934  2 Sheets-Sheet 1
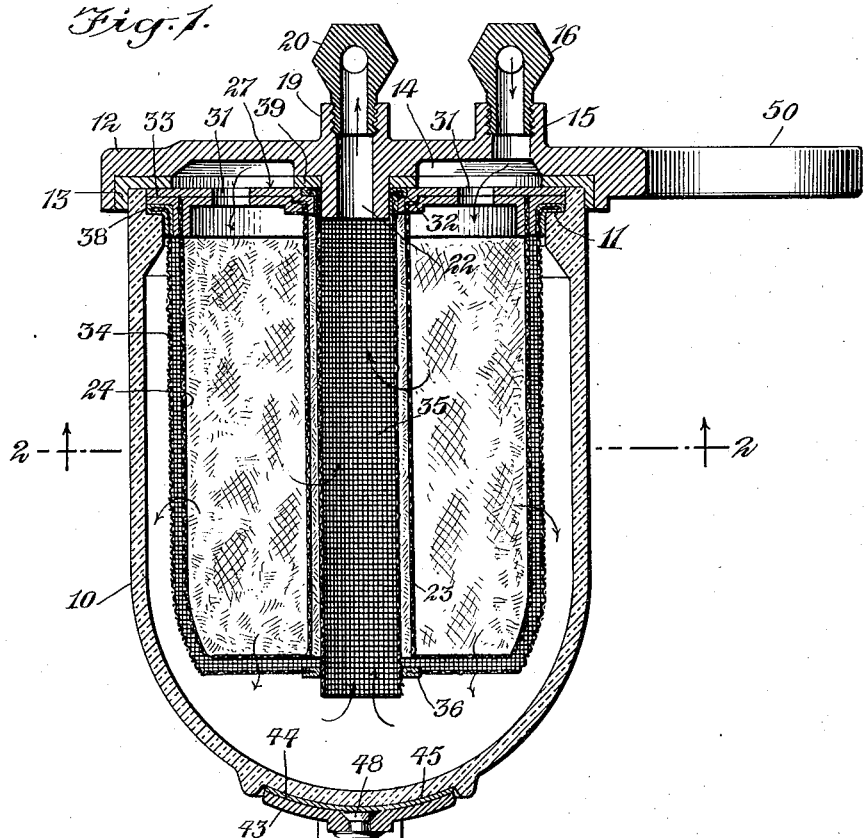
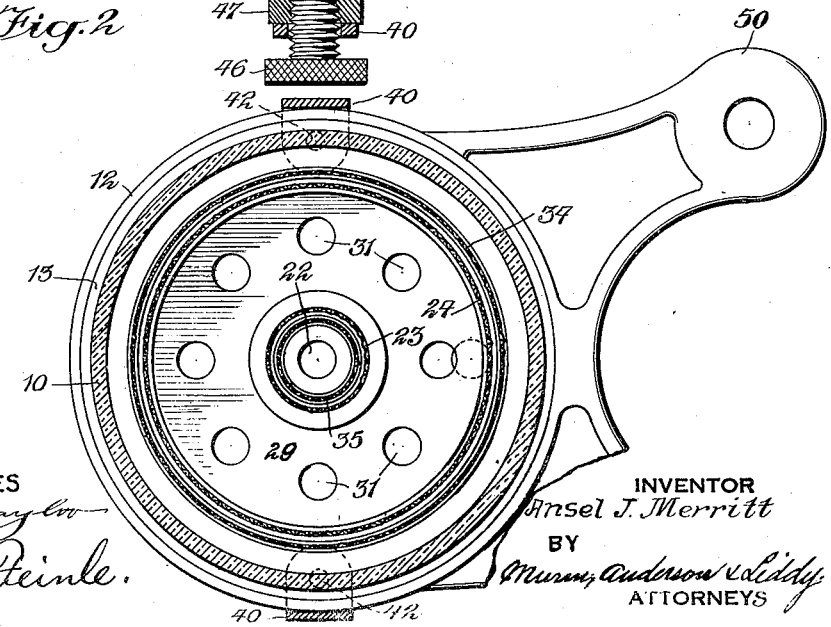
WITNESSES  
INVENTOR  
Ansel J. Merritt  
BY  
ATTORNEYS April 30, 1935.   A. J. MERRITT   1,999,913
FILTER
Filed Sept. 19, 1934   2 Sheets-Sheet 2
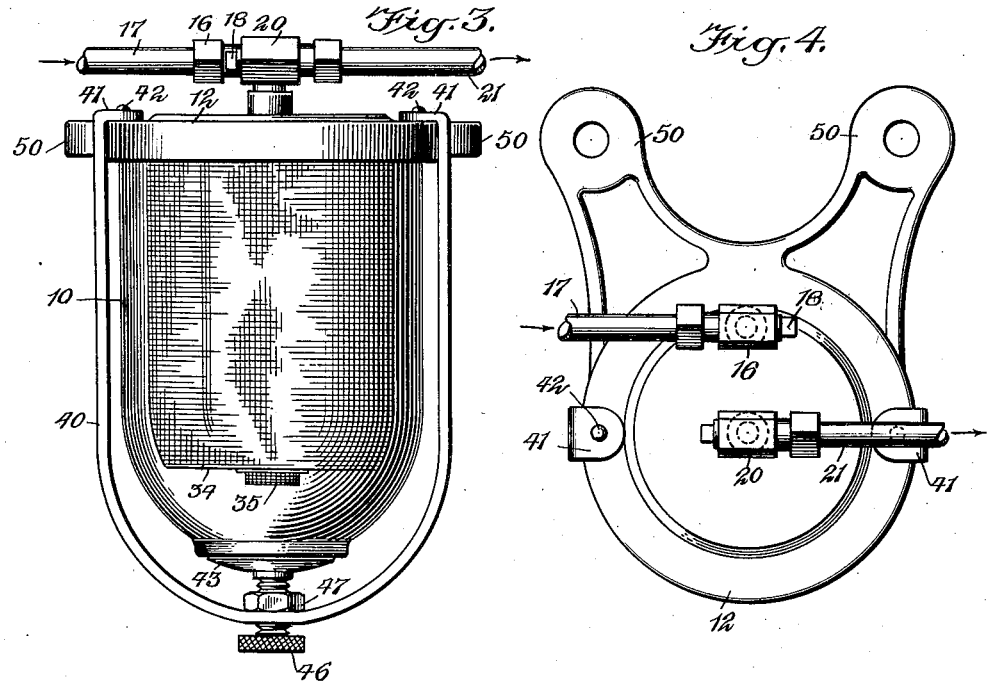
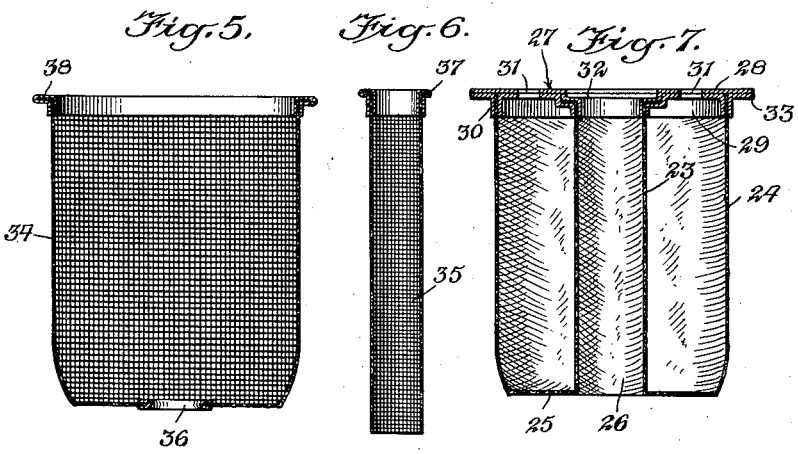
INVENTOR
Ansel J. Merritt Patented Apr. 30, 1935

1,999,913

UNITED STATES PATENT OFFICE 1,999,913

FILTER

Ansel J. Merritt, New York, N. Y.

Application September 19, 1934, Serial No. 744,725

2 Claims. (Cl. 210—164)

This invention relates to a filter for straining or filtering lubricating oil used in engines, and fuel oil used in heating systems.

The principal object of the invention is the provision of a device of the indicated character embodying improvements whereby a large quantity of oil may be filtered, cleaned or strained in a comparatively short time without requiring the subjection of the oil to an unusually high pressure.

Another object of the invention is the provision of improvements whereby parts may be readily assembled and disassembled to enable cleaning operations to be readily carried out.

A further object of the invention is the provision of an improved, simple, and inexpensive removable and replaceable filtering or straining unit in a device of the indicated character.

With the foregoing, other objects of the invention will appear from the following specification which describes the invention, while the appended claims define its scope, the invention being illustrated in the accompanying drawings, in which Fig. 1 is a central vertical section through a filter embodying the features of the invention;

Fig. 2 is a section taken on the line 2—2 of Fig. 1 and looking in the direction indicated by the arrows;

Fig. 3 is a side view of the filter;

Fig. 4 is a top view;

Fig. 5 is a vertical section of one of the parts of the coarse filter and cage;

Fig. 6 is a section of the other part of the coarse filter and cage;

Fig. 7 is a central section of the fine filter unit.

Referring now more particularly to the several views of the drawings, it will be apparent that the filter as illustrated includes a casing or bowl 10 which may be made of any preferred material, but which is made preferably of glass in the present instance. The lower closed end of the bowl 10 is semi-spherical. The upper end of the bowl 10 is open and has a circular seat 11 on the inside thereof. A head 12 of metal is provided for the bowl 10 to close its upper end. The head 12 is rabbeted to receive a gasket 13 L-shaped in cross section, which fits on the upper open end to form a fluid tight joint between the head 12 and the open end of the bowl 10. The head 12 is recessed as at 14 to provide a clearance space or flow passage for the oil to be filtered as it is delivered to the filter through the inlet 15 integral with the head 12. An elbow coupling 16 is threaded in the nipple 15. An oil supply pipe 17 is connected with the coupling 16. The coupling 16 has a removable test plug 18. The head 12, centrally thereof, has an outlet nipple 19 formed integral therewith. An elbow coupling 20 is threaded in the nipple 19, and a pipe 21 is connected with said coupling 20 and leads to a point of discharge of the filtered or strained oil. The outlet nipple 19 is formed to provide a neck 22 on the inside of the head 12.

The means for filtering or straining the lubricant or oil consists of a unit shown in section most clearly in Fig. 7. This filtering or straining unit includes inner and outer tubular walls 23 and 24 respectively, which are joined by a bottom wall 25. These walls 23 and 24 and 25 are made of comparatively fine filtering material such as fabric, felt, or flannel. The walls 23, 24 and 25 form a sort of annular bag having a central opening 26, the latter being formed by the tubular wall 23. A head 27 of metal is secured in any suitable manner to the top of the bag formed by the walls 23, 24 and 25. The head 27 consists of three parts, namely, a disk 28, a flanged disk 29 spanning the walls 23 and 24, and a flanged ring 30 surrounding the wall 24. These parts 28, 29 and 30 are securely fastened together. The disks 28 and 29 have a plurality of aligned inlet apertures 31. The disk 28 has a central circular seat 32 formed thereon which surrounds the tubular wall 23. The peripheral portions of the disk 28 and the ring 30 provide a rim 33.

In order to prevent the distortion of the walls 23, 24 and 25 of the filtering unit hereinbefore described, there is provided the following means. Use is made of a hollow or bag-shaped body 34 made of relatively coarse material compared with that from which the walls 23, 24 and 25 are made. This material may be wire mesh or any other suitable foraminous or reticulated material. The body 34 is large enough to receive the filtering unit therein and conforms generally to the shape thereof. A tubular part 35, made of the same material as the body 34, is arranged centrally of the body. The lower end of the part 35 is received in a grommet 36 secured to the bottom of the body 34. The upper end of the part 35 has a metal rim 37. The upper end of the body 34 has a metal rim 38. It will be apparent that the parts 34 and 35 when brought together form a cage as shown in Fig. 1. The filtering means consisting of the walls 23, 24 and 25 may be received within this cage with the rim 33 in contact with the rim 38, and the rim 37 on the seat 32. With the filtering unit and cage assembled in the manner explained, they may be held in place by being clamped between the seat 11 and the gasket 13, as shown in Fig. 1. The neck 22 is received in the upper end of the part 35, and the gasket 39 surrounds the neck 22 between the rim 37 and the head 12 to form a fluid tight joint at this point.

Clamping means is provided to effectually clamp the head 12 in place on the bowl 10 and also to hold the filtering unit and its confining means or cage in place. The clamping means includes a U-shaped clamping member 40 having inwardly directed apertured terminals 41, which receive studs 42 respectively on the head 12. A metal pad 43 having a resilient lining 44 conforms to the bottom of the bowl 10 and is received in a depression 45 therein. A thumbscrew 46 extends through a hole in the clamping member 40, and said screw 46 has a nut 47 adjustable thereon, and is swivelly connected with the pad 43, as at 48. By manipulating the screw 46 the terminals 41 of the clamping member 40 may be engaged with the studs 42 or be disengaged therefrom. When the terminals 41 have been engaged with the studs 42, the nut 47 may be adjusted to bring it in contact with the member 40 to set up the desired clamping pressure on the head 12. Disengagement of the terminals 41 is brought about by disengaging the pad 43 from the depression 45, and then canting the member 40 and at the same time raising it to clear the studs 42. The terminals 41 are engaged with the studs 42 by reversing this operation.

From the foregoing it will be obvious that when the parts are assembled the oil to be filtered may flow into the recess 14 through the inlet 15 and will flow through the apertures 31 into the filtering unit to be filtered or strained by the walls 23, 24 and 25. These walls will separate from the oil any foreign matter such as grit, carbon, and metal or other particles. The strained oil flows through the body 34 and the part 35, circulates in the bowl 10, and ultimately flows through the outlet 19 to the point of use. If desired, the head 12 may be provided with lugs 50, apertured to receive suitable fastening bolts to secure the filter in operative position wherever desired.

I claim:

1. In a filter, a casing, a head for said casing, a filtering unit comprising spaced tubular walls, a bottom joining said walls, and an apertured plate joining the upper ends of said walls, said walls and bottom being made of filtering material, a separate cage for said unit, said cage being pervious to liquid, said unit being disposed within said cage with the upper end of the cage fitting the upper end of the unit, and said casing and head being engageable with means at the upper ends of both the unit and cage to securely hold them in place.

2. In a filter, a casing, a head for said casing, a filtering unit comprising spaced tubular walls, a bottom joining said walls, and an apertured plate joining the upper ends of said walls, said walls and bottom being made of filtering material, a separate cage for said unit, said cage being pervious to liquid, said unit being disposed within said cage with the upper end of the cage fitting the upper end of the unit, and said casing and head being engageable with means at the upper ends of both the unit and cage to securely hold them in place, inlet means on the head for delivering liquid to be filtered to a point above said plate to pass therethrough, said cage having a central tubular portion, and outlet means on the head fitting said tubular portion for the outflow of the filtered liquid.

ANSEL J. MERRITT.